US005942266A

United States Patent [19]

Okamura et al.

[11] Patent Number: 5,942,266

[45] Date of Patent: Aug. 24, 1999

[54] EDIBLE PEARLY CAPSULE AND METHOD FOR ITS PRODUCTION

[75] Inventors: Kenichiro Okamura; Shunpei Ito, both of Osaka, Japan

[73] Assignee: Sansho Kaken Kabushiki Kaisha, Osaka, Japan

[21] Appl. No.: 09/083,089

[22] Filed: May 22, 1998

[30] Foreign Application Priority Data

May 27, 1997 [JP] Japan .................................... 9-136945

[51] Int. Cl.[6] ................................ A23D 9/00; A23L 1/48

[52] U.S. Cl. ............................ 426/89; 426/573; 426/803; 426/615; 426/575; 426/577

[58] Field of Search ............................. 426/89, 573, 575, 426/577, 576, 802, 803, 615

[56] References Cited

U.S. PATENT DOCUMENTS

| | | | |
|---|---|---|---|
| 3,892,870 | 7/1975 | Wood | 426/573 |
| 3,922,360 | 11/1975 | Sneath | 426/573 |
| 4,096,286 | 6/1978 | Sakakabara | 426/577 |
| 4,117,172 | 9/1978 | Bradshaw et al. | 426/276 |
| 4,119,739 | 10/1978 | Barwick et al. | 426/573 |
| 4,202,908 | 5/1980 | Nesmeyanov et al. | 426/72 |
| 4,305,964 | 12/1981 | Moran et al. | 426/99 |
| 4,347,261 | 8/1982 | Challen et al. | 426/573 |
| 4,348,418 | 9/1982 | Smith et al. | 426/104 |
| 4,375,481 | 3/1983 | Kuwabara et al. | 426/93 |
| 4,507,327 | 3/1985 | Ueda | 426/276 |
| 4,702,921 | 10/1987 | Ueda | 426/576 |
| 5,133,979 | 7/1992 | Clarke et al. | 426/49 |
| 5,296,245 | 3/1994 | Clarke et al. | 426/577 |
| 5,422,134 | 6/1995 | Hart et al. | 426/573 |
| 5,456,937 | 10/1995 | Chalupa | 426/573 |
| 5,498,439 | 3/1996 | Bonner | 426/577 |
| 5,516,543 | 5/1996 | Amankonah et al. | 426/573 |
| 5,744,337 | 4/1998 | Price et al. | 435/178 |

FOREIGN PATENT DOCUMENTS

| | | |
|---|---|---|
| S48-16183 | 5/1973 | Japan . |
| S55-148072 | 11/1980 | Japan . |
| S56-32974 | 4/1981 | Japan . |

OTHER PUBLICATIONS

Montagne 1961 Larousse Gastromonique Crown Publishers Inc New York p. 798.

*Primary Examiner*—Carolyn Paden
*Attorney, Agent, or Firm*—Armstrong, Westerman, Hattori, McLeland & Naughton

[57] ABSTRACT

The invention provides edible pearly capsules containing a large amount of an oleaginous substance as the core substance. The above capsules can be provided by the method which comprises contacting liquid drops (a) of a composition comprising an aqueous solution of a water-soluble macromolecular substance at least a portion of which is marmelo mucilage ($a_1$), an oleaginous substance ($a_2$), e.g. animal or vegetable oil, a water-soluble polyvalent metal salt ($a_3$), e.g. calcium chloride, and sodium chloride ($a_4$) with an aqueous solution of a water-soluble salt of alginic acid (b) to thereby form a water-insoluble film of alginic acid salt on the outer surface of said liquid drops (a).

3 Claims, No Drawings

EDIBLE PEARLY CAPSULE AND METHOD FOR ITS PRODUCTION

TECHNICAL FIELD

The present invention relates to an edible pearly capsule containing a large amount of an oleaginous substance as the core material. The invention further relates to a method of producing such edible pearly capsules.

BACKGROUND OF THE INVENTION

Caviar-like edible capsules find application as man-made salmon eggs, jellies, etc. in the food industry.

For example, Japanese Kokai Tokkyo Koho S55-148072 describes man-made fish eggs simulating salmon eggs, which comprise edible particles each consisting of a core (A) and a shell (B) wherein the core (A) is composed of either a sol or a gel and the shell (B) is composed of a gel with a water content of 85–95%. According to the specification, the artificial fish eggs resemble natural salmon eggs in the sound they produce when chewed.

Japanese Kokai Tokkyo Koho S56-32974 discloses a man-made fish roe available upon gelation with a physiologically acceptable metal ion and treatment with a smoking liquor of ungelled artificial eggs each consisting of an edible sol shell comprising a water-soluble salt of alginic acid (A) and pectin (B) in a weight ratio of about 0.2 to about 3, which is gelable with said metal ion, and an internal edible sol core entrapped in said shell and substantially ungelable with said metal ion. This artificial fish-egg product is softer than the conventional product but has a tough, dense shell layer, thus closely resembling natural salmon eggs in mouthfeel or palatability, and water content.

Technologies for the production of man-made salmon eggs are further described in Japanese Kokai Tokkyo Koho S55-102373 and S55-114273 as well.

In addition, Japanese Patent Publication S48-16183 describes a method of producing a fluid-containing stable capsule which comprises contacting a mixture of a capsule core-constituting fluid and a polyvalent metal salt with a salt of alginic acid or a low-methoxylated pectin, or a mixture thereof, to thereby form a gel-like shell. The product capsule is said to find application as a jelly food, an additive to ice cream, a pharmaceutical capsule, or a nutrient capsule.

Edible capsules are essentially required to contain vegetable oil and/or other oleaginous substances in large quantities.

However, when it is attempted to entrap a large amount of an oleaginous substance in the capsule core, the integrity of the capsule as such cannot be maintained and the resulting limitation on the entrappable amount of the oleaginous substance has been a major obstacle to application of such capsules in the food industry.

OBJECT AND SUMMARY OF THE INVENTION

Developed in the above state of the art, the present invention has for its object to provide an edible pearly capsule containing an oleaginous substance in an increased amount and a method for its production.

The edible pearly capsule according to the present invention comprises a liquid drop (a) comprising a water-soluble macromolecular substance (a1) at least a portion of which is a marmelo mucilage, an oleaginous substance (a2), and a water-soluble polyvalent metal salt (a3) and, as cladding its outer surface thereof, a water-insoluble shell formed from a water-soluble salt of alginic acid (b).

The method of producing edible pearly capsules according to the present invention comprises contacting liquid drops (a) of a composition comprising an aqueous solution of a water-soluble macromolecular substance at least a portion of which is marmelo mucilage ($a_1$), an oleaginous substance ($a_2$), a water-soluble polyvalent metal salt ($a_3$), and sodium chloride ($a_4$) with an aqueous solution of a water-soluble salt of alginic acid (b) to thereby form a water-insoluble alginic acid salt film on the outer surface of said liquid drops (a).

DETAILED DESCRIPTION OF THE PREFERRED EMBODIMENTS OF THE INVENTION

The present invention is now described in detail, referring chiefly to the relevant production technology.

In the production method according to the present invention, the composition used for said liquid drops (a) comprises an aqueous solution of a water-soluble macromolecular substance ($a_1$), an oleaginous substance ($a_2$), a water-soluble polyvalent metal salt ($a_3$), and sodium chloride ($a_4$). In the composition, said water-soluble macromolecular substance ($a_1$), water-soluble polyvalent metal salt ($a_3$), and sodium chloride ($a_4$) occur as dissolved in water.

The water-soluble macromolecular substance ($a_1$) for use in the present invention is a water-soluble high polymer at least a portion of which is marmelo mucilage. The proportion of the marmelo mucilage in the water-soluble macromolecular substance ($a_1$) is generally not less than 50 weight % and preferably as large as possible, for example not less than 60 weight %, 70 weight %, 80 weight %, and, for still better results, 90 weight %.

Marmelo mucilage is typically obtained by immersing quince seeds in water or hot water with occasional stirring for a few to about 24 hours to extract a mucilaginous substance and filtering off the seeds. Marmelo mucilage is considered to be chiefly composed of a gum called cydonin and an oily component called amygdalin.

The water-soluble macromolecular substance, other than marmelo mucilage, includes a variety of water-soluble macromolecular substances derived from animals, plants, or microorganisms, such as carboxymethylcellulose, methylcellulose, dextrin, starch, starch glycolate, gum xanthane, guar gum, mannan, agar, gum juglan, locust bean gum, carrageenan, gum Arabic, gum tragacanth, gum karaya, succinoglucan, pullulan, dextran, curdlan, zein, trehalose, soybean protein, various glues, gelatin, albumin, casein, pectin, and gluten, among others. Among those substances, gum xanthane, guar gum, gum tragacanth, and gum karaya are preferred. However, compared with marmelo mucilage, those water-soluble macromolecular substances have lower capacities for entrapping the oleaginous substance ($a_2$) and while some of them are excessively threading, others are liable to undergo gelation in the presence of the water-soluble polymetal salt ($a_3$) to adversely affect the stability of the composition or are incompatible with sodium chloride. Therefore, due care should be exercised in the selection of such a water-soluble macromolecular compound or its amount relative to marmelo mucilage so that the effect of the invention will not be compromised.

The oleaginous substance ($a_2$) includes but is not limited to vegetable oil (e.g. salad oil, soybean oil, sesame oil, rapeseed oil, peanut oil, sufflower oil, sunflower oil, corn germ oil, cottonseed oil, rice bran oil, etc.), butter, lard, egg yolk oil, DHA, EPA, and squalane. Such processed foods as mayonnaise, ketchup, margarin, etc. can also be used advantageously as oleaginous substance ($a_2$).

The preferred water-soluble polyvalent metal salt ($a_3$) includes water-soluble salts of calcium, such as calcium chloride, calcium lactate, and calcium acetate.

The use of sodium chloride ($a_4$) is preferred for increasing the specific gravity of liquid drops (a) of a composition containing an oleaginous substance ($a_2$) of low specific gravity and inhibiting the rapid reaction between the water-soluble polyvalent metal salt ($a_3$) in the liquid drops and the water-soluble salt of alginic acid (b) in the aqueous alginate solution. Moreover, it is of low cost. Sodium chloride ($a_4$) is preferably incorporated in as high a concentration as possible within its solubility limit in the composition.

On the other hand, as the water-soluble salt of alginic acid (b), sodium alginate or potassium alginate can be used with advantage.

In the production of edible pearly capsules, liquid drops (a) of a composition comprising said water-soluble macromolecular substance at least a portion of which is marmelo mucilage ($a_1$), oleaginous substance ($a_2$), water-soluble polyvalent metal salt ($a_3$), and sodium chloride ($a_4$) are contacted with an aqueous solution of a water-soluble salt of alginic acid (b). The liquid drops (a) can be prepared typically by dripping, or ejecting in a mist form, a composition comprising the above-mentioned components from a nozzle.

The proportions of said components in the above-mentioned composition can each be freely selected from a broad range. With the whole composition being taken as 100 weight %, the water-soluble macromolecular substance ($a_1$) may account for 0.01–30 weight % (particularly 0.02–20 weight % and more preferably 0.05–10 weight %), the oleaginous substance ($a_2$) for 10–95 weight % (particularly 20–90 weight % and more preferably 30–85 weight %), the water-soluble polyvalent metal salt ($a_3$) for 0.01–10 weight % (particularly 0.02–5 weight % and more preferably 0.05–3 weight %), and sodium chloride ($a_4$) for 1–35 weight % (particularly 1–20 weight %) in many instances. The proportion of the solvent water in the composition may generally be 1–89 weight % (particularly 5–80 weight % and more preferably 10–70 weight %), but a portion (for example not more than about 1/10) of the water may be replaced with an organic solvent such as alcohol (particularly ethanol).

Referring to the water-soluble macromolecular substance at least a portion (generally not less than 50 weight %) of which is marmelo mucilage ($a_1$), the entrapping capacity of the oleaginous substance ($a_2$) will be insufficient if the proportion of marmelo mucilage is too small, while an excess of the mucilage would disrupt the balance of the composition. If the amount of oleaginous substance ($a_2$) is too small, the reason for existence of the edible capsule will be deprived of. If its amount is too large, the capsule will be destroyed. If the amount of the water-soluble polyvalent metal salt ($a_3$) is too small, the capsule will be inadequate in strength, while an excess of the polyvalent metal salt ($a_3$) will adversely affect the palatability of the capsule. If the amount of sodium chloride ($a_4$) is too small, it will be difficult to provide a neatly-shaped pearly capsule, while if used in excess sodium chloride will not be uniformly dissolved in the composition.

In addition to the above components ($a_1$)–($a_4$), the composition may be supplemented with appropriate amounts of useful materials such as amino acids, chemical condiments, sepia, spices, vitamins, various flours, minerals, etc. and additives such as specific gravity control agents such as glycerol, food colors, flavorants, fillers, antiseptics (e.g. sodium acetate, sodium benzoate, etc.), and so on. Those useful materials and additives can also be incorporated in the aqueous solution of said water-soluble salt of alginic acid (b).

The concentration of said water-soluble salt of alginic acid (b) in the aqueous alginate solution which is to be contacted with liquid drops (a) of the above composition is generally about 0.01–5 weight %, particularly about 0.05–3 weight %, and more preferably about 0.1–2 weight %.

When liquid drops (a) of said composition are contacted with an aqueous solution of a water-soluble salt of alginic acid (b), a water-insoluble alginate film forms on the outer surface of liquid drops (a) [when the water-soluble polyvalent metal salt ($a_3$) in the liquid drops (a) is a calcium salt, a film of calcium alginate is formed]. Optionally, the resulting capsules are rinsed with water and subjected to pH adjustment and other after-treatment. The capsules, before or after aqueous rinse, may be contacted with the aqueous alginate solution again so as to form a more substantial insoluble film.

In the course of the above contact treatment, the sodium chloride ($a_4$) in the initial composition constituting the liquid drops (a) is completely or partially dissolved in the aqueous alginate (b) solution and eliminated and the anion residue of the water-soluble polyvalent metal ($a_3$) and water are also transferred, in substantial measures, to the aqueous alginate (b) solution, with the result that the encapsulated liquid drops (a) become rich in the oleaginous substance ($a_2$).

The size of the edible pearly capsules which can thus be obtained is not particularly restricted but is generally about 0.5–15 mm and preferably about 1–10 mm.

The edible pearly capsules comprising said liquid drops (a) clad with a water-insoluble alginate film (b) according to the present invention can be handled either as they are or stored as wetted with a suitable liquid or suspended or sedimented in a suitable liquid vehicle in a vessel. The vessel includes the conventional bottle, a vessel equipped with a system by which the pearly capsules can be dispensed as needed or a vessel equipped with a system by which the pearly capsules can be intentionally collapsed in dispensing.

The edible pearly capsules can be ingested as they are as a dainty or served as deposited on sushi, boiled rice, a slice of bread, a biscuit, a pancake, or the like. The capsules may also be given as food to pet animals such as the dog, cat, small bird, poultry, ornamental fish, and so on. The edible pearly capsules can be used as sweets, an ice cream additive, pharmaceutical capsules, or alimentary capsules.

The principle of formation of edible pearly capsules according to the present invention is based on the phenomenon that when liquid drops (a) of the above composition are contacted with an aqueous solution of a water-soluble salt of alginic acid (b), the water-soluble salt of alginic acid (b) surrounding the liquid drops (a) is converted to a water-insoluble salt of alginic acid by the water-soluble polyvalent metal salt ($a_3$) contained in the liquid drops (a) to form a water-insoluble shell.

The marmelo mucilage which is an essential component of the water-soluble macromolecular substance ($a_1$) in the liquid drops (a) of the above composition is not only edible but capable of holding a very large amount of oleaginous substance ($a_2$), does not undergo gelation even in the presence of water-soluble polyvalent metal salt ($a_3$), is capable of entrapping a large amount of sodium chloride ($a_4$) as well, shows a suitable viscosity in the condition containing said components either as entrapped or dissolved therein, and not excessively threading. Therefore, the composition can be easily extruded from a nozzle to provide liquid drops (a).

The conventional technology for the production of capsules containing an oleaginous substance ($a_2$) requires (1) a complicated procedure of extruding the oleaginous substance ($a_2$) from the inner orifice of a duplex nozzle and an aqueous solution of a water-soluble polymer containing a water-soluble polyvalent metal salt ($a_3$) from the outer orifice of the nozzle or (2) a system in which the oleaginous substance ($a_2$) is emulsified with a surfactant or the like. However, in accordance with the present invention wherein marmelo mucilage is used as the water-soluble macromolecular substance ($a_1$), even a composition comprising large amounts of oleaginous substance ($a_2$) and water-soluble polyvalent metal salt ($a_3$) and even sodium chloride ($a_4$) can be neatly formed into liquid drops (a) by mere blending and extruction from a simple nozzle. Moreover, such liquid drops can be formed by mere blending without the aid of an emulsifier to provide the desired pearly capsules.

EXAMPLES

The following examples are intended to illustrate the present invention in further detail. In the examples, all parts and % are by weight.

Example 1

As a preliminary experiment, the entrappability or solubility of oleaginous substance ($a_2$), water-soluble polyvalent metal salt ($a_3$) and sodium chloride ($a_4$) in aqueous solutions of various water-soluble macromolecular substances ($a_1$) was evaluated and, in addition, the stability of each composition was also investigated.

The experimental protocol was as follows.

1. Prepare 50 ml of a 2% aqueous solution of each water-soluble macromolecular substance ($a_1$).
2. With the above aqueous solution under agitation, add 17.5 g of sodium chloride ($a_4$) and dissolve (the concentration of NaCl is about 35% concentration).
3. With stirring continued, add 0.2 g of calcium chloride as water-soluble polyvalent metal salt ($a_3$) and dissolve (the concentration of $CaCl_2$ is about 0.4%).
4. With vigorous stirring continued, add salad oil containing 1% of egg yolk as oleaginous substance ($a_2$).

The results are presented in Table 1. In Table 1, CMC denotes carboxymethylcellulose and PG alginate denotes propylene glycol ester of alginic acid.

TABLE 1

| Experimental No. | Water-soluble macromolecular substance | Blending limit of salad oil | Remarks |
|---|---|---|---|
| 1 | Marmelo mucilage | 700% | |
| 2 | Gum xanthane | 450% | |
| 3 | CMC-Na | 0% | Gelling with Ca salt |
| 4 | Methylcellulose | 50% | |
| 5 | Pullulan | 10% | |
| 6 | Mannan | 50% | |
| 7 | Agar | 0% | Solidifies at room temperature |
| 8 | Gelatin | 0% | Solidifies at room temperature |
| 9 | Pectin | 100% | |
| 10 | Pectin-Na | 0% | Gelling with Ca salt |
| 11 | Locust bean gum | 100% | |
| 12 | Na alginate | 0% | Gelling with Ca salt |
| 13 | PG alginate | 150% | |
| 14 | Carrageenan | 100% | |
| 15 | Starch | 50% | |
| 16 | Starch glycolate Na | 0% | Precipitated by Ca salt |
| 17 | Dextrin | 0% | No viscosity gain |
| 18 | Gum tragacanth | 400% | |
| 19 | Gum Arabic | 0% | |
| 20 | Casein Na | 0% | No viscosity gain |
| 21 | Albumin | 0% | No viscosity |
| 21 | Albumin | 0% | gain |
| 22 | Gum Karaya | 200% | |
| 23 | Guar gum | 400% | |

It is apparent from Table 1 that the largest amount of salad oil can be entrapped when marmelo mucilage is used as water-soluble macromolecular substance ($a_1$). In terms of the blending limit of salad oil, gum xanthane is second to marmelo mucilage but the differential is as great as over 1.5 times in favor of marmelo mucilage. Though omitted from Table 1, whereas separation began after 5 minutes in the case of gum xanthane, separation began only after 30 minutes in the case of formulations containing marmelo mucilage. With other water-soluble macromolecular substances, separation was observed invariably within 5 minutes. Thus, compared with other water-soluble macromolecular substances, marmelo mucilage is by far superior in the property to entrap the oleaginous substance ($a_2$) in stable condition.

Example 2

To 24.33 parts of water were added 0.60 part of calcium chloride, 0.07 part of marmelo mucilage, and 8.5 parts of sodium chloride, and the mixture was stirred for dissolution to provide 33.5 parts of an aqueous solution. This solution was designated No. 1 fluid. On the other hand, 70.0 parts of salad oil was used as No. 2 fluid. Furthermore, 5 parts of an aqueous solution prepared by dissolving 0.03 part of casein sodium in 4.97 parts of water was designated No. 3 fluid.

While the above No. 1 fluid was stirred vigorously, No. 2 fluid was added thereto gradually to give a viscous sol and, then, No. 3 fluid was added and mixed. In this manner, a composition stable for at least 30 minutes was obtained.

While a 0.2% aqueous solution of sodium alginate, a typical water-soluble salt of alginic acid (b), was gently stirred, the above composition was dripped, in the form of drops (a), through a nozzle. The procedure gave fish egg-shaped attractive edible pearly capsules with a diameter of 1–10 mm, each capsule consisting in a liquid drop (a) clad with a water-insoluble film of calcium alginate. The capsules were subjected to aqueous rinse and pH adjustment, transferred to a vessel, and stored in slightly wetted condition. The capsule diameter decreased with time to 1–3 mm.

Example 3

To 25.0 parts of water were added 0.50 part of calcium chloride, 6.0 parts of marmelo mucilage, 5.0 parts of sodium chloride, 3.0 parts of glycerol, and a small amount of preservative, and the mixture was stirred for dissolution to provide No. 1 fluid. On the other hand, 10.5 parts of salad oil, 10.0 parts of soybean lecithin, 10.0 parts of egg yolk oil, and 30.0 parts of olive oil were blended to provide No. 2 fluid.

With No. 1 fluid being stirred vigorously, No. 2 fluid was added gradually to prepare a viscous sol composition.

With a 0.2% aqueous solution of sodium alginate, a typical example of the water-soluble salt of alginic acid (b), being gently stirred, the above composition was dripped, in the form of drops (a), through a nozzle. In this manner, fish egg-like attractive edible pearly capsules with a diameter of 1–10 mm, each capsule consisting in the drop (a) clad with a water-insoluble film of calcium alginate, was obtained. The capsules were subjected to aqueous rinse and pH adjustment, transferred to a vessel, and stored as wetted with an external fluid comprising a 10% aqueous solution of wheat starch. The capsule diameter decreased with time to 1–5 mm.

Example 4

To 18.0 parts of water were added 2.0 parts of calcium chloride, 0.4 part of marmelo mucilage, 2.0 parts of sodium chloride, 10.0 parts of glycerol, and a small amount of preservative, and the mixture was stirred for dissolution to prepare No. 1 fluid. On the other hand, 60.0 parts of salad oil, 0.2 part of soybean lecithin, 0.2 part of egg yolk oil, and 7.2 parts of olive oil were blended to prepare No. 2 fluid.

With the above No. 1 fluid being vigorously stirred, the above No. 2 fluid was gradually added so as to give a viscous sol composition.

With a 1.0% aqueous solution of sodium alginate, a typical example of the water-soluble salt of alginic acid (b), being gently stirred, the above composition was dripped, in the form of drops (a), through a nozzle. In this manner, fish egg-like attractive edible pearly capsules with a diameter of 1–10 mm, each capsule consisting in the drop (a) clad with a water-insoluble film of calcium alginate, was obtained. The capsules were subjected to aqueous rinse and pH adjustment, transferred to a vessel, and stored as wetted with an external fluid comprising a 10% aqueous solution of gum Arabic. The capsule diameter decreased with time to 1–3 mm.

Example 5

To 30.0 parts of water were added 0.1 part of calcium chloride, 0.08 part of marmelo mucilage, 10.0 parts of sodium chloride, 5.0 parts of glycerol, and a small amount of preservative, and the mixture was stirred for dissolution to prepare No. 1 fluid. On the other hand, 50.0 parts of salad oil, 0.8 part of soybean lecithin, 0.02 part of egg yolk oil, and 4.0 parts of olive oil were blended to prepare No. 2 fluid.

With the above No. 1 fluid being vigorously stirred, the above No. 2 fluid was gradually added so as to give a viscous sol composition.

With a 0.4% aqueous solution of sodium alginate, a typical example of the water-soluble salt of alginic acid (b), being gently stirred, the above composition was dripped, in the form of drops (a), through a nozzle. In this manner, fish egg-like attractive edible pearly capsules with a diameter of 1–10 mm, each capsule consisting in the drop (a) clad with a water-insoluble film of calcium alginate, was obtained. The capsules were subjected to aqueous rinse and pH adjustment, transferred to a vessel, and stored as wetted with an external fluid comprising salad oil. The capsule diameter decreased with time to 1–3 mm.

According to the present invention, edible pearly capsules containing a large amount of an oleaginous substance in their cores can be produced with advantage on a commercial scale. The edible pearly capsules thus obtained are very satisfactory in appearance, palatability, class distinction and nutritive value, thus being of high market value.

What is claimed is:

1. An edible pearly capsule comprising a liquid drop (a) comprising a water-soluble macromolecular substance at least a portion of which is marmelo mucilage ($a_1$), an oleaginous substance ($a_2$), and a water-soluble polyvalent metal salt ($a_3$) and, as cladding its surface, a water-insoluble film formed from a water-soluble salt of alginic acid (b).

2. The edible pearly capsule according to claim 1 wherein said marmelo mucilage accounts for not less than 50 weight % of said water-soluble macromolecular substance ($a_1$).

3. A method of producing edible pearly capsules which comprises contacting liquid drops (a) of a composition comprising an aqueous solution of a water-soluble macromolecular substance at least a portion of which is marmelo mucilage ($a_1$), an oleaginous substance ($a_2$), a water-soluble polyvalent metal salt ($a_3$), and sodium chloride ($a_4$) with an aqueous solution of a water-soluble salt of alginic acid (b) to thereby form a water-insoluble alginic acid salt film on the outer surface of said liquid drops (a).

* * * * *